United States Patent [19]

Bimond et al.

[11] 4,111,829

[45] Sep. 5, 1978

[54] DEVICE FOR DESTROYING FOAM

[75] Inventors: Jean-Pierre Bimond; Flavien Lazarre, both of Pau, France

[73] Assignee: Societe Nationale Elf Aquitaine (Production), Paris, France

[21] Appl. No.: 756,189

[22] Filed: Jan. 3, 1977

Related U.S. Application Data

[63] Continuation-in-part of Ser. No. 688,838, May 21, 1976, abandoned.

[30] Foreign Application Priority Data

Jul. 31, 1975 [FR] France .............................. 75 23891

[51] Int. Cl.$^2$ .............................................. B01D 19/00
[52] U.S. Cl. ............................ 252/361; 261/DIG. 26; 55/87; 252/321
[58] Field of Search ....................... 252/360, 361, 321; 55/87, 178; 261/DIG. 26

[56] References Cited

U.S. PATENT DOCUMENTS

| | | | |
|---|---|---|---|
| 2,800,459 | 7/1957 | Dijksman et al. | 252/361 X |
| 2,813,833 | 11/1957 | Revallier | 252/361 X |
| 2,972,769 | 2/1961 | Keating et al. | 55/178 |
| 3,199,417 | 8/1965 | Young et al. | 55/178 |
| 3,238,144 | 3/1966 | Fortman | 252/361 |
| 3,420,450 | 1/1969 | Bergholm | 55/87 X |
| 3,425,899 | 2/1969 | Nilsson | 252/361 |
| 3,512,570 | 5/1970 | Ess et al. | 252/361 |
| 3,723,343 | 3/1973 | Herzhoff et al. | 252/361 |

Primary Examiner—Norman Yudkoff
Attorney, Agent, or Firm—Brisebois & Kruger

[57] ABSTRACT

Device for destroying foam, and especially the foam of drilling fluids, comprises a container provided with an inlet for gas under pressure, an inlet for foam, an outlet for separated liquids and an outlet for separated gas, and within which the gas under pressure is confined within a divergent conical first space having its smaller end at the inlet for pressurized gas, said conical space and the part of the internal surface of the container outside this member bounding a geometrically closed second space and in which the inlet for foam enters said container through that portion of the container wall which bounds said geometrically closed space.

2 Claims, 3 Drawing Figures

U.S. Patent    Sept. 5, 1978    4,111,829
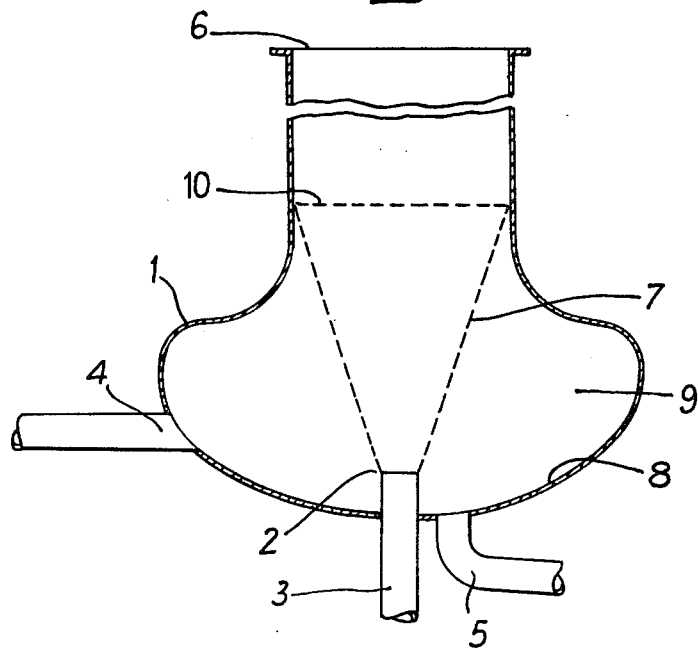
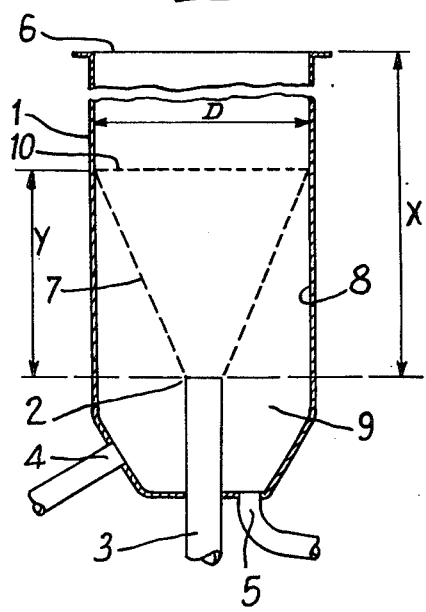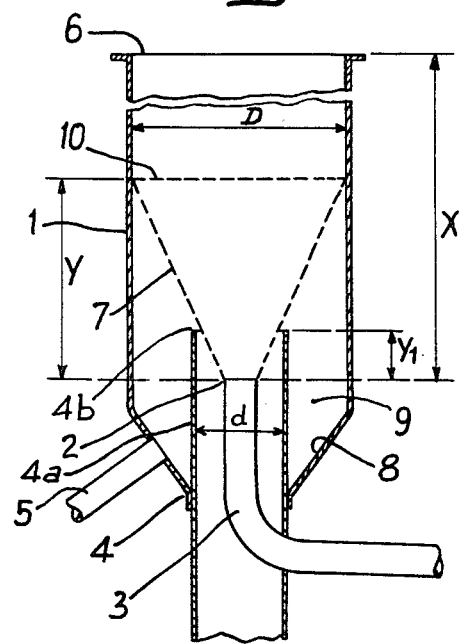

DEVICE FOR DESTROYING FOAM

SUMMARY OF THE INVENTION

This application is a continuation-in-part of our prior application Ser. No. 688,838, filed May 21, 1976, now abandoned.

This invention relates to a device for the destruction of foam formed by the emulsion of gases in liquids and especially foams employed as drilling fluids.

In drilling installations, when the nature of the rocks traversed and the fluids contained permits it, foams may be used because of their physical properties and especially because of their density. These foams are produced from foaming products and additives propelled by pumps and gas under pressure and are immediately injected. The same foams, when they return to the surface, cannot be handled by the pumps. To reuse the liquid and gas it is necessary to break the emulsion and this consumes demulsifiers which are expensive products and generally not very effective. It is also possible to store the foams and wait for their natural destruction to take place, but this takes a long time because the foams are quite stable. Finally, it should be noted that the pure and simple disposal of the foam while economical, causes pollution problems.

In the general case of drilling through sedimentary series covering deposits, the gas employed for the manufacture of the foam is usually air. When the rocky formation contains indications of hydrocarbons, the air which is one of the constituents of the foam becomes charged with gaseous hydrocarbons and may form an explosive mixture. To cope with this problem, methane may be used in the production of the foam. This eliminates any risk in the well itself, but renders storage dangerous because, as the foam breaks up, it releases a gaseous mixture which may be explosive.

The present invention seeks to overcome these difficulties by mechanically breaking up the foam as it leaves the well so that, on the one hand, the percentage of hydrocarbons which may exist in the rejected gas is less than the minimum which will cause flammability and, on the other hand, the foaming liquid is recovered and may be reused after the separation of solid debris.

The device according to the invention, in order to break up the foams and especially to destroy foams due to the emulsion of gas and liquids, consists of a container provided with at least one inlet comprising a tube through which gas under pressure may be injected, at least one inlet for foam, at least one outlet for the liquid separated, and at least one outlet for the separated gas, and is characterized by the fact that the gas under pressure, after having been injected through the injection tube into the container enters a space bounded by a divergent conical envelope having its smaller end at the outlet of the injection tube, said conical envelope and the part of the internal surface of the container outside said jacket bounding a geometrically closed space into which the inlet for the foam opens.

In accordance with a preferred embodiment, the container is cylindrical and coaxial with the injection tube for gas under pressure, the outlet for the separated gases consists of a straight section of the cylindrical container in alignment with the section into which the tube for injecting gas under pressure opens.

In an embodiment in which a reduction in bulk is sought, the inlet for foam extends into the container in the form of a duct coaxial with the tube for injecting gas under pressure, said coaxial duct opening into the container through an orifice constituted by a straight section of said duct positioned beyond the outlet of the injector tube, which itself is a straight section of the injector tube, by a distance equal to about three times the diameter of the coaxial duct.

The invention will be better understood from the following description, given purely by way of illustration and example, with reference to the accompanying drawings in which:

FIG. 1 is a schematic view illustrating the principle of the apparatus;

FIG. 2 shows a device comprising a cylindrical container; and

FIG. 3 shows a device comprising two concentric cylindrical containers.

FIG. 1 illustrates the principle of the apparatus and shows a container 1 entered through the outlet 2 of an injection tube 3 for gas under pressure. This container comprises an inlet duct 4 for the foam, an outlet 5 for separated liquids, said outlet 5 being positioned at the bottom of the container 1, and an outlet 6 for the rejection gases.

The gas injected under pressure into the container 1 through the outlet 2 of the injection tube enters a space bounded by a divergent conical envelope 7 at the outlet of the injection tube 3. The conical envelope 7 and the part 8 of the internal surface of the container outside this envelope define therebetween a geometrically closed space 9. Duct 4 for admitting foam opens into the part 8 of the internal surface of the container which partially defines the geometrically closed space 9. It will be noted that the foam coming into contact with the gas under pressure along the generatrices of the conical surface 7 is broken up so that the emulsion breaks down. The length of the conical surface 7 is limited by the line of intersection of the surface 7 with the internal surface 8 of the container. In order that the emulsion may break up with a yield approximating 100%, it is necessary that, beyond the line 10 and up to the outlet 6 for the rejected gases, the wall of the container have a sufficient area, which depends principally upon the geometric shape of the container.

It will be appreciated that the line 7 merely indicates the surface of contact between the injected gas under pressure and the foam is not a physical member. Similarly, there is no physical structure indicated by the line 10.

FIG. 2 schematically illustrates an embodiment in which the container 1 is cylindrical and coaxial with the injector tube 2 for gas under pressure. This figure shows the same components as FIG. 1. The outlet 6 for the separated gases consists of a straight section of the cylindrical container into which the tube for injecting gas under pressure opens.

The distance Y between the plane of the outlet 2 of the injector tube 3 and the plane 10 containing the curve of intersection between the conical surface 7 and the container 1 is of the order of 3 times the diameter D of said container.

An embodiment such as shown in FIG. 3 makes it possible to reduce the bulk of the device for the destruction of foam.

In FIG. 3, the duct 4 for admitting foam projects into the container 1 in the form of a duct 4a coaxial with the tube 3 for injecting gas under pressure. The coaxial duct 4a opens into the container 1 through an orifice 4b consisting of a straight section of said duct and positioned beyond the orifice 2 of the injector tube 3 by a distance $Y_1$ slightly less than three times the diameter $d$ of the coaxial duct 4a.

The distance Y between the plane of the outlet 2 of the injector tube 3 and the line 10 which lies in the plane containing the curve of intersection between the conical envelope 7 and the container 1 is of the order of three times the diameter of said container. This embodiment causes a complete destruction of the foam while taking up a space substantially less than that required by the device of FIG. 1.

The injected gas is usually air provided by compressors. It may advantageously have the exhaust gases of motors added thereto or be replaced by such gases. These motors may be those driving the compressors used to create the foam. This arrangement makes it possible, on the one hand, to reduce the financial burden inherent in the compression of the injected air and, on the other hand, to reduce the concentration of oxygen in the injected gas and thereby reduce the risk of producing an inflammable mixture if the latter contains hydrocarbons.

The use of either device for destroying foam results in an elimination of foam with a yield of 100% by causing, on the one hand, the dilution of the gas coming from the gas injector for making the foam to a content less than the percentage required for inflammability, and, on the other hand, the recovery of liquid and thus of expensive foaming products. Such devices for destroying foam may be used in various chemical or food industries in which foams having a substantial stability are produced. Such devices may also be used in installations for treating water and purifying the water of rivers and canals.

What is claimed is:

1. A device for the destruction of foam due to the emulsion of gas in liquid which comprises, a container equipped with, means for injecting a gas under pressure into said container, at least one inlet for the admission of foam, at least one outlet for separated liquid, and at least one outlet for separated gas, and in which both said injecting means directs said gas into a divergent conical jet having conical sides, and said foam inlet opens into a space between the outside of the sides of said jet and an internal surface of the container, and wherein said means for injecting a gas comprises an injector tube having a straight injector section, said at least one inlet for admitting foam comprises a duct projecting into the container, coaxially with and outside the injector tube, said duct opening into the container and having a straight section which projects beyond the end of the injector tube by a distance of the order of three times the diameter of the coaxial duct.

2. A device for the destruction of foam due to the emulsion of gas in liquid which comprises, a container equipped with, means for injecting a gas under pressure into said container, at least one inlet for the admission of foam, at least one outlet for separated liquid, and at least one outlet for separated gas, and in which said injecting means directs said gas into a divergent conical jet having conical sides, and said foam inlet opens into a space between the outside of the sides of said jet and an internal surface of the container and further comprising, gas supply means for supplying exhaust gas from an internal combustion engine to said means for injecting a gas under pressure.

* * * * *